United States Patent [19]
Shingai

[11] Patent Number: 5,293,612
[45] Date of Patent: Mar. 8, 1994

[54] SELECTIVE DUMP METHOD AND APPARATUS

[75] Inventor: Randall K. Shingai, San Jose, Calif.

[73] Assignee: Tandem Computers Incorporated, Cupertino, Calif.

[21] Appl. No.: 870,735

[22] Filed: Apr. 16, 1992

Related U.S. Application Data

[63] Continuation of Ser. No. 350,674, May 11, 1989, abandoned.

[51] Int. Cl.5 .................................................. G06F 12/16
[52] U.S. Cl. ..................................... 395/425; 364/DIG. 1
[58] Field of Search ... 395/400 MS File, 425 MS File; 364/200 MS File, 900 MS File

[56] References Cited

U.S. PATENT DOCUMENTS

| | | | |
|---|---|---|---|
| 4,068,303 | 1/1978 | Morita | 395/400 |
| 4,084,230 | 4/1978 | Matick | 395/425 |
| 4,456,954 | 6/1984 | Bullions, III et al. | 395/400 |
| 4,458,316 | 7/1984 | Fry et al. | 364/200 |
| 4,467,411 | 8/1984 | Fry et al. | 364/200 |
| 4,490,783 | 12/1984 | McDonough et al. | 395/775 |
| 4,581,702 | 4/1986 | Saroka et al. | 395/425 |
| 4,682,281 | 7/1987 | Woffinden et al. | 364/200 |
| 4,714,993 | 12/1987 | Livingston et al. | 364/200 |
| 4,731,740 | 3/1988 | Eguchi | 364/200 |
| 4,835,686 | 5/1989 | Furuya et al. | 364/200 |
| 4,890,221 | 12/1989 | Gage | 364/200 |
| 4,897,813 | 1/1990 | Kumbasar | 365/49 |
| 4,928,223 | 5/1990 | Dao et al. | 364/200 |
| 4,943,914 | 7/1990 | Kubo | 364/200 |
| 4,961,135 | 10/1990 | Uchihori | 364/200 |
| 5,101,494 | 3/1992 | Bilski et al. | 395/700 |

Primary Examiner—Joseph L. Dixon
Assistant Examiner—Reba I. Elmore
Attorney, Agent, or Firm—Townsend and Townsend

[57] ABSTRACT

A method and process for providing a memory dump of less than the entire contents of memory is provided. The memory locations to be dumped are selected on the basis of recency of use, so that there is a high probability that portions of memory needed for analysis or evaluation of the computer system will be included in the selective dump. Preferably, the select ion is made on the basis of information or hardware which is already provided in the computer system. In one preferred embodiment, memory to be dumped is selected on the basis of memory locations encoded for by a translation lookaside buffer.

2 Claims, 3 Drawing Sheets

Microfiche Appendix Included
(4 Microfiche, 204 Pages)

SELECTIVE DUMP METHOD AND APPARATUS

This is a continuation of Ser. No. 07/350,674, filed May 11, 1989, now abandoned.

A microfiche appendix is included in this application, consisting of 4 microfiche, 204 frames.

The present invention is directed to a method and apparatus for dumping selected portions of memory and, in particular, to dumping portions of memory which are selected to include memory which has been more recently used than at least some non-selected memory.

BACKGROUND INFORMATION

Among the tools and methods used for evaluating and analyzing the performance of computers is a memory dump. In typical prior memory dumps, the contents of all memory locations, along with various registers, accumulators, and the like, are written to a permanent storage medium. A memory dump is either initiated by a user or is automatically initiated upon detection of certain conditions, such as error conditions.

A memory dump is used to assist in evaluating computer performance, and, in particular, for diagnosing pathologic or error conditions in a computer. By knowing the contents of the memory locations, registers, and the like, the analyst can, in most cases, determine the source of the error or pathologic condition. This enables the analyst to determine what, if any, alterations to the software and/or hardware need to be undertaken to prevent or reduce the recurrence of such error conditions in the future.

Certain error conditions are associated with overwriting or destruction of some memory locations. In a few cases, the destruction or overwriting occurs at memory locations which had previously contained the data needed to analyze the error condition. Nevertheless, in the great majority of cases, information needed to analyze the error condition is found somewhere in the memory dump.

A difficulty with providing a memory dump is that it prevents at least a part of the computing device from operating in its normal fashion. That is, the memory dump takes a certain amount of time and, during this time, the computer is not available for its normal use. A further difficulty with memory dumps is that large volumes of data are produced. When memory dumps are stored, as is often the case with large producers of computers, the volume of storage needed for past memory dumps can be quite large.

Both the above-mentioned problems are exacerbated as larger memories are provided for computers. In a computer with a main memory of, e.g., 96 megabytes (mb) ($96 \times 2^{10}$ bytes), a dump of the full memory might take 10-12 minutes.

Accordingly, it would be advantageous to provide for a memory dump which generally produces the information needed for analysis, but which takes less time and less data storage to accomplish.

SUMMARY OF THE INVENTION

The present invention includes dumping only a portion of memory. The portion which is selected for dumping includes those portions of memory which have been most recently accessed by the processor. Thus, the undumped portions of memory are substantially less recently used by the processor than the dumped portions of memory.

When the computing environment is a multiprocessor environment, the memory which is dumped can be made specific to a processor. In this way, when a particular processor is associated with an error condition, those portions of memory which have been accessed most recently by the particular processor can be dumped.

In a preferred embodiment of the present invention, the portions of memory selected for dumping are selected on the basis of a translation lookaside buffer (TLB), which is used to translate virtual memory addresses to physical memory addresses. When a new translation must be stored in a full buffer, the new translation is written over a less recently used location of the buffer. In this way, the translation lookaside buffer is continually replacing the less recently used entries with more recently used entries.

By using a TLB for selecting the portions of memory to be dumped, the dumping of the entire contents of memory can be avoided while maintaining a high likelihood that information needed for analysis of an error condition, or for evaluation of the computer operation, will be available in the dump.

DETAILED DESCRIPTION OF THE PREFERRED EMBODIMENTS

According to the present invention, the memory dump can be accomplished in a selective manner by selecting some portions of memory for dumping and leaving other portions of memory undumped. The selection is made such that, with respect to a particular processor, the dumped portions include memory locations which have been more recently used by the processor, compared to at least some of the undumped portions of memory.

Preferably, the memory dumping scheme is accomplished using hardware and/or software already present in the computer for different purposes. In this way, providing a selective memory dump does not require providing substantial additional hardware, and requires a reduced amount of programming to accomplish. In one preferred embodiment, the portions of memory to be dumped are selected using a translation lookaside buffer. A translation lookaside buffer is commonly provided in systems which have a virtual memory operation.

In general terms, a virtual memory operation can be used whenever the user-addressable memory size is greater than the physical size of the addressable main memory. Commonly, this occurs in a memory hierarchy system. Examples of such memory hierarchies are those between a main memory system (such as a RAM memory) and a secondary memory system (such as disk memory), or the memory hierarchy between a memory cache and a main memory.

The present invention can be used with any scheme which stores addresses (or indications of addresses) of more recently used memory locations. The present system is described in terms of a translation lookaside buffer, although, as will be clear to those skilled in the art, it would be operable for other types of less-recently-used (LRU) address replacement schemes.

Figure 1:
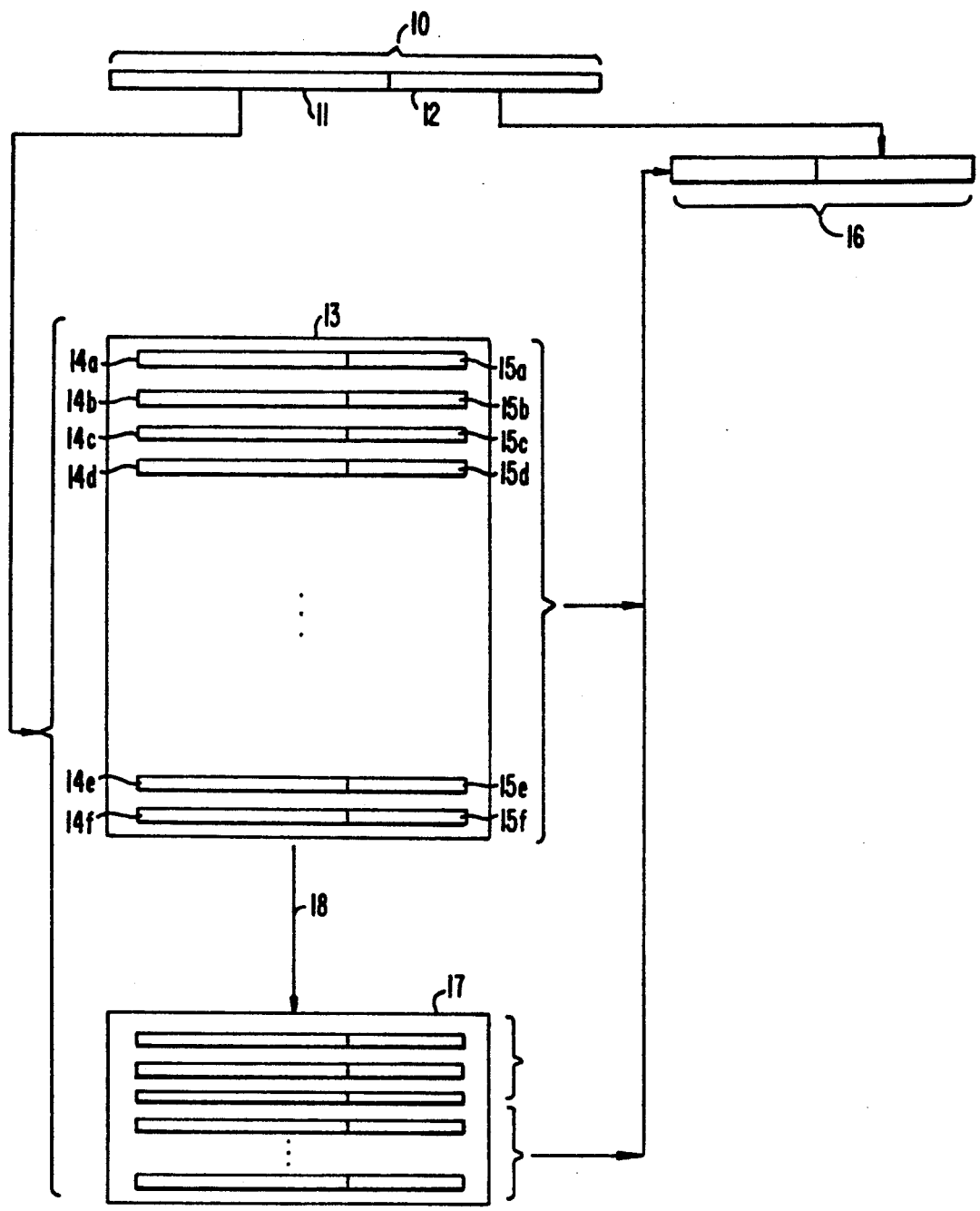
FIG. 1 is a schematic depiction of a translation from a virtual address to a physical address using either a page table of a TLB.

Referring to FIG. 1, in a typical virtual memory system, a virtual address 10 includes a first portion 11, which indicates a virtual page address, and a displacement or offset portion 12 which specifies the address of a byte within the virtual page. The virtual page address is translated into a physical page address using a look-up table 13. For example, one or more page table entries (PTE) can be provided which contain a plurality of words, each having a virtual page address 14a–14f as an index portion, and a corresponding physical page address 15a–15f concatenated thereto. When using the page table, the virtual page address portion 11 of the requested virtual address 10 is matched with the index portion 14a–14f of an entry in the page table. The corresponding physical page address 15a–15f is then used, such as by combining the physical page address 15a–15f with the displacement portion 12 of the virtual address to provide the required physical byte address 16.

The page table 13 is typically stored in main memory or in other relatively slow memory. Because virtual-to-physical translation occurs often, and because virtual addresses often occur in the same page as previously accessed virtual addresses, the translation process is made more rapid by using a small but fast memory 17 which contains a portion of the page table (PTC). This small but fast memory acts as a cache for the page table, and is referred to as the "translation lookaside buffer" (TLB).

When a virtual-to-physical translation is needed, the TLB 17 is accessed to determine whether the required translation can be obtained from this fast memory portion. If the required page is not in the TLB, the slower page table 13 is used to obtain the translation. Each time the page table is used, the entry from the page table is added via 18 to the translation lookaside buffer 17. Because the translation lookaside buffer 17 is smaller than the page table 13, the TLB 17 eventually becomes full, and further additions to the TLB require that previous TLB entries be overwritten. It is then necessary to decide which of the old entries in the TLB should be overwritten by a new TLB entry.

One scheme for overwriting specifies that the TLB entry to be overwritten is that entry which was least recently used, i.e., the entry which has remained unused for the longest period of time. Such least-recently used algorithms have been found to provide a good "hit" ratio, i.e., the portion of virtual memory requests which are in the TLB. However, a strict least-recently-used algorithm requires maintaining information on the recency of use for all entries, and the attendant overhead is often unacceptable. Therefore, a number of TLB replacement schemes have been developed which are not strictly least-recently-used schemes, but which approximate least-recently-used replacement schemes. These approximate schemes are sometimes referred to as "less-recently-used" schemes (LRU).

Figure 2:
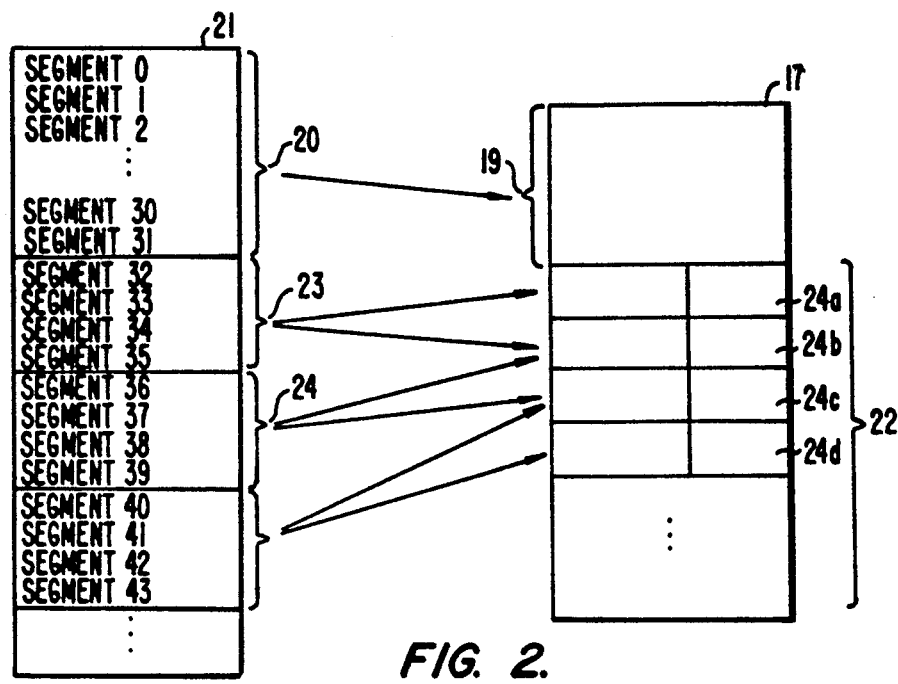
FIG. 2 is a schematic depiction of a set associative mapping between memory locations and a TLB.

In the preferred embodiment, the TLB 17 includes a portion which has such an approximate LRU replacement scheme. As depicted in FIG. 2, the first half 19 of the TLB 17 is a permanent buffer which always contains an address translation for the first 32 segments 20 of memory virtual 21, which are used primarily or exclusively by the system. The second half 22 of the TLB 17 is used in connection with a single set-associative memory hierarchy. In a set-associative hierarchy, the entry of the TLB which is overwritten cannot be selected from out of all of the possible TLB entries. Rather, each entry can be written only in one of a set of TLB positions, which is less than all possible TLB positions.

For example, in one set-associative scheme, addresses occurring in the first four segments of non-system memory 23 can be written in, for example, only the first or second position 24a, 24b in the TLB second half 22. The addresses in the second four segments of memory 24 can be written in only the second or third positions 24b, 24c in the TLB second half 22, and so forth. Of course, the number of memory segments in a mapping scheme can be other than four, and the size of the TLB set which is mapped to can be other than two. In any such scheme, when a new entry is to be written into the TLB, the position in the TLB which is overwritten is not necessarily the least-recently-used position in all of the TLB. Rather, it is the least-recently-used position of those positions in the TLB where the new entry has permission to be written, i.e., among the set of the TLB which is associated with that memory location. Therefore, overwriting does not always erase the least-recently-used entry in all of the TLB. In most cases, overwriting will occur at a TLB entry which has been less-recently-used than at least one other TLB entry. Under such a scheme, the TLB does not necessarily contain strictly the most recently used references, but will tend to contain references which were more recently used than would be obtained by, for example, a random replacement algorithm.

The choice of the particular replacement or overwriting scheme for the TLB depends on a balance between the cost of the replacement algorithm, in terms of overhead, and the benefits, in terms of an increase in the hit ratio. For purposes of the present invention, however, any TLB scheme will be operable which overwrites, with some degree of preference, the TLB entries which are less-recently-used. This is because the memory dump, which is based on the TLB, will tend to provide information which is useful to the analyzer of the memory dump when the memory dump contains memory which has been relatively more recently accessed by the processor.

Although the present invention can be used in many types of computing environments, an embodiment of the invention will be described with reference to a particular type of computing system.

Figure 3:
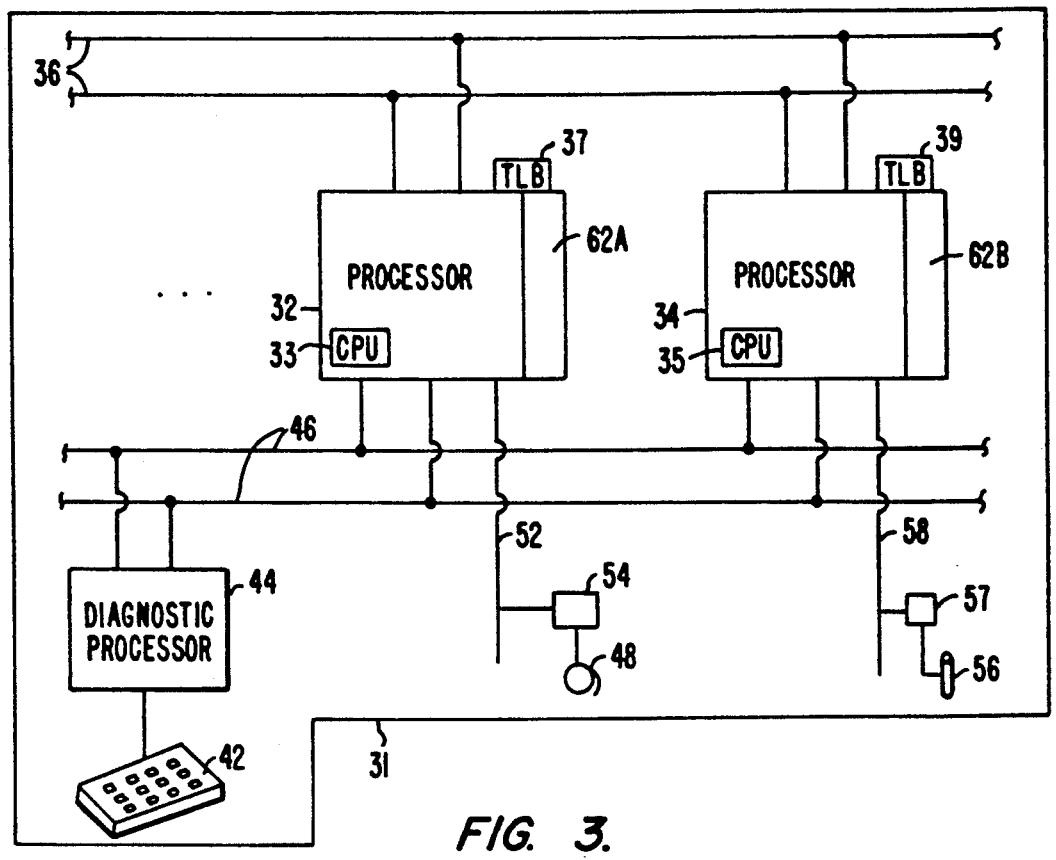
FIG. 3 is a schematic depiction of a portion of a multiprocessor unit and its connection to memory dump storage devices.

Referring now to FIG. 3, a computing system is schematically depicted having at least two processors 32, 34, each having a central processing unit (CPU) 33, 35. Each processor 32, 34 has a separate TLB associated with that processor 37, 39. The processors are connected by an interprocessor bus 36. Various input/output devices are connected, either directly or indirectly, to the processors 32, 34. In the embodiment depicted in FIG. 3, a keyboard terminal 42 is connected to a diagnostic processor 44 which, in turn, is connected to the processors 32, 34 along a maintenance bus 46. A magnetic tape drive 48 is in communication with a processor 32 by means of a first communication line 52, connected to the tape drive 48 by an addressable output unit 54.

The addressable output unit 54 has a unique and recognizable output address. A disk unit 56 is in communication with the second processor 34 by means of a second communication line 58, connected to the disk unit 56 by an addressable output unit 57.

During normal operation of the computer, and prior to initiation of a memory dump, typically, addresses which are accessed by the processor are written to storage locations in the TLB. These addresses are encoded in that the TLB contains an indication of the physical address, coupled to an indication of the virtual address. "Encoding" includes the trivial case in which the "encoded" address is the address itself. As the TLB becomes full, writing of the encoded storage locations causes erasing of at least some previously written encoded addresses. The TLB entry to be overwritten is selected using the set-associative LRU scheme, described above.

In the preferred embodiment, the TLB encodes for about 8 megabytes out of a total of 96 megabytes of memory. Thus, the TLB encodes for less than about 10%, preferably about 8%, of all memory locations.

In the embodiment depicted in FIG. 3, a memory dump can be either a tape dump or a bus dump. A tape dump is achieved by a processor CPU 33 by means of executing stored microcode instructions. In order for the microcoding to be manageable, a tape dump is typically uncomplicated, such as by dumping all of the memory selected according to the TLB, as described more fully below. In contrast, a bus dump process can run on one of the processors 34, and can include relatively more complicated options and instructions, compared to a tape dump, as described more fully below. A listing of microcode for a tape dump and source code for a bus dump, usable in connection with the present invention, are provided in the microfiche appendix. The first sheet of microfiche (labeled "1 of 1") contains the tape dump microcode. The second through fourth sheets (labeled "1 of 3, 2 of 3, and 3 of 3") contain the bus dump code.

A memory dump can be initiated either by inputting a request for a dump, such as by using the keyboard terminal 42, or upon detection of a specified condition, such as detection of an error condition. In a multiprocessor environment, such as that depicted in FIG. 3, the memory dump can be selected with respect to a particular processor 32, 34. Thus, when a user requests a memory dump using the keyboard terminal 42, the user can specify that the dump is to be with respect to one or more specified processors 32, 34. Similarly, when an error is detected in a particular processor, a memory dump can be automatically or manually initiated with respect to that processor. A selective memory dump is made with respect to a particular processor when the memory which is selected includes, preferably, those memory locations which were more recently used by that particular processor.

Figure 4:
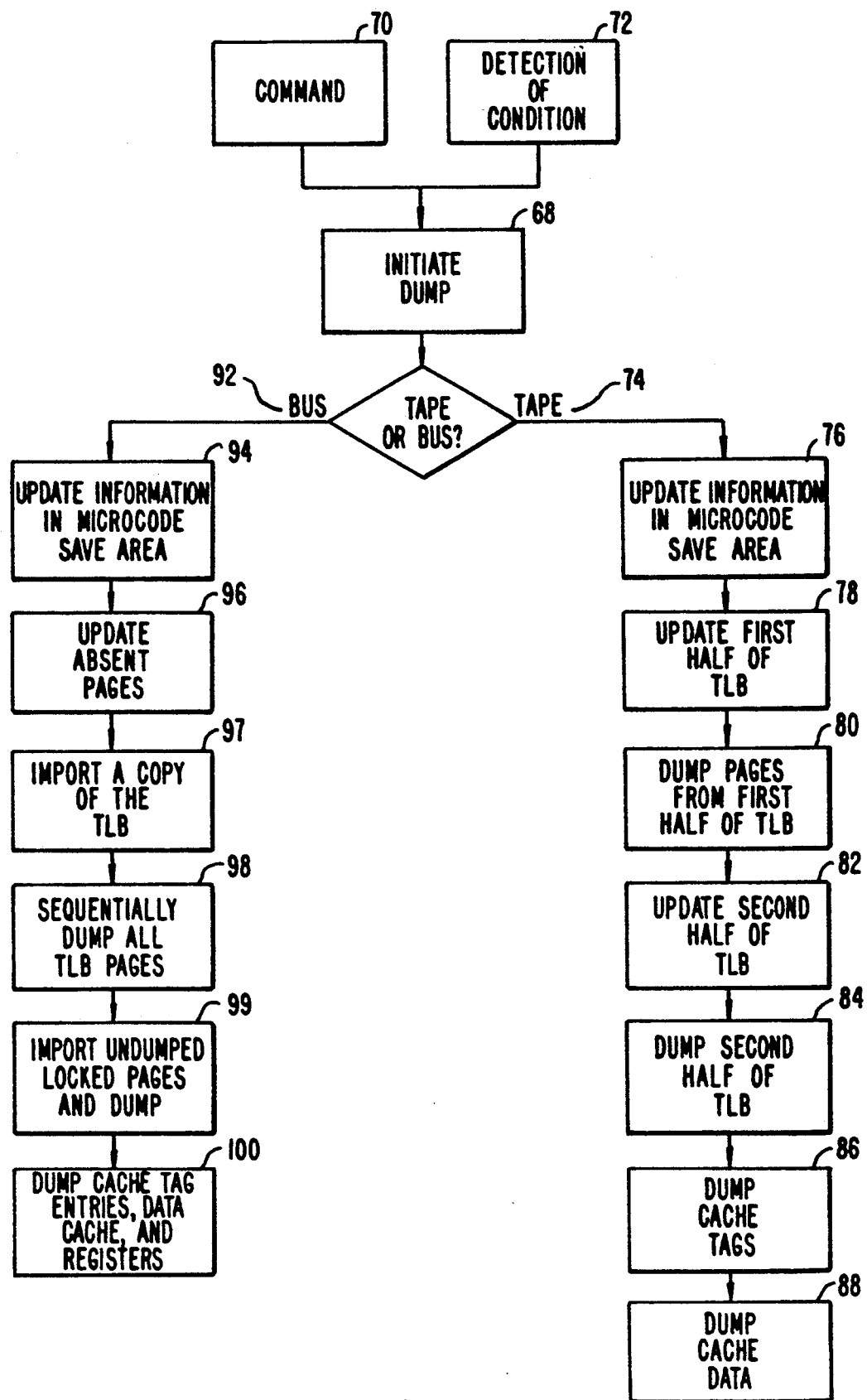
FIG. 4 is a flow chart of a memory dump according to the present invention.

Referring now to FIG. 4, a memory dump is initiated 68, as described above, either by a command input by a user 70 or upon detection of a condition 72, such as an error condition. The subsequent events depend upon whether the dump is to be a bus dump or a tape dump. During a tape dump 74, a command is entered 70 into the keyboard 42 instructing the particular processor 32 to dump to an address 54, such as the address associated with a tape drive 48. As noted above, a tape dump is relatively straightforward. The tape dump consists of a dump of the memory locations which are encoded in the TLB 39 associated with the processor 34. The TLB itself is also dumped.

During a tape dump, the dump is controlled by, e.g., the processor CPU 33 according to microcode stored in the processor 32. First, the microcode will update information 76 in the microcode save area 62A. The save area 62A, 62B is an area which is relatively insensitive to power interruptions, and is intended to save or maintain integrity of data in the event of a power interruption. Information which is updated in the save area can include information relating to the processor type, the physical memory size, and the number of pages in the dump.

In one preferred embodiment, there are 16 pages of TLB. The tape dump proceeds by first dumping the first half of the TLB and then the second half of the TLB. In one embodiment of the invention, the entries in the TLB are first checked against page table entries (PTE) to ascertain that the TLB entries are valid. This checking is conducted because the microcode, which accomplishes a tape dump, uses certain marker bits in the PTE or TLB differently than those marker bits are used by the ordinary processor software. Because of this difference, certain entries in the TLB may be invalid and may not be recognized as such by the tape dump microcode. One example of checking marker bits relates to absent entries in the TLB. One of the marker bits associated with each page entry in the TLB is the "absent" bit. When the computer system is first powered-up (or after a power failure), the physical address portions of the TLB are 0-filled and the absent bit for those portions is set. As pages are referenced, entries are placed into the TLB and the corresponding absent bits are reset. Normally, then, the absent bit will be set only for those entries which have the physical address portion 0-filled (except for the set absent bit). There are certain situations, however, in which the absent bit is set, and yet there is useful data in the physical address portion of the corresponding TLB entry. One such example occurs when there has been a page fault. Following a page fault, it is often useful to read-in not only the page which caused the page fault, but any adjacent absent pages as well. Following such read-in of the adjacent absent pages, the absent bit for those adjacent pages would normally be reset. However, the software used in the preferred embodiment leaves the absent bit set (for purposes of collecting statistical information relating to read-ins of adjacent pages following a page fault). In such a case, the tape dump microcode is configured to dump an entry which has the "absent" bit set, provided the physical address portion of the entry is not 0-filled.

In cases in which an entry is truly absent or "absented," the microcode will update the absent entries 78 where this is possible. Such updating is possible because the "absenting" of a TLB entry only invalidates the portions that relate to a physical address. The portion of the TLB entry that contains an indication of a virtual address is not invalidated when a TLB entry is "absented." If the virtual address contained in a TLB entry is still in use, its underlying Page Table Entry can be inspected. If the underlying PTE contains a valid physical page number, the physical address portion of the TLB entry can be updated with that physical page number. In cases where actually-absent pages cannot be updated, physical page 0 (i.e., the page whose physical address is 0, containing system information) will be substituted for the absent page. In this context, physical page 0 acts as a place-holder to assure proper synchronization of the dumped data.

Following the updating of absent entries, the pages in the first half of PTC are dumped 80. The dumping is accomplished by referring to each entry in the TLB, and determining the corresponding physical address for each entry. When that physical address is determined, the contents of memory at that physical address are sent to the tape drive 48 along communication line 52, and are recorded on the tape drive 48.

Following the dumping of the first half of the TLB, the second half of the TLB will be updated 82 to supply absent entries where possible. After the updating, the pages in the second half of the PTC are dumped 84.

Following dumping of the select ed memory locations, additional information is also dumped to the tape drive 48. The tags for the data cache are preferably dumped 86. Also, the data cache itself is preferably dumped 88.

The procedures involved in a bus dump will now be described. A bus dump 92 can be accomplished even when the processor 32 is not fully functioning, e.g., is in a "frozen" or error state. This is because the bus dump is initiated and controlled by the bus dump process, a program which can be run on another, non-frozen processor 34, rather than by the frozen procesor CPU 33. In the tape dump described above, the processor CPU 33, using stored microcode, executes the entire dump itself. In contrast, during a bus dump process, the processor CPU 33 acts only as a server, which recognizes and executes commands provided by the bus dump process running on the second processor 34. A bus dump will be accomplished, as described more fully below, by instructing the processor 32 to provide data over the interprocessor bus 36. The data which is provided over the interprocessor bus 36 is received by a bus dump processor, a program running in the second process 34, and is routed through the second communications line 58 to a storage device, such as the disk 56.

Because the first processor 32 is in a frozen state, the bus dump first requires a change to the state of the processor 34. This is accomplished by the bus dump process, sending a command along the maintenance bus 46 to the diagnostic processor 44. This command causes the diagnostic processor 44 to, in turn, send a command to the frozen processor 32. This command causes the frozen processor 32 to undergo a change of state which will permit the bus dump process to directly ask the processor 32 for items needed in a particular type of dump. The bus dump process can, for example, provide a full memory dump, a selective memory dump, such as a dump of memory and addresses encoded by the corresponding TLB 37, a dump of specified TLB pages, a dump of specified physical pages, a dump of the cache tags, a dump of the cache data, or the like. Typically, the user will select the type of dump when the bus dump application program is started. In the present preferred embodiment, the user can select between a full dump (i.e., a dump of the entire memory) and a partial dump, as described below.

The following describes a bus dump procedure to dump the memory locations encoded by the TLB. The bus dump 92, as with the tape dump, will first update information 94 in the microcode save area 62A. Next, microcode will cause a pass to be made through the entries in the TLB, and will update absent entries which have a valid page number in the appropriate PTE and the appropriate segment phase table (SPT) 96. Typically, page 0 of physical memory will first be dumped. Physical page 0 is the page having physical address 0. It contains certain system information, including an identification of the processor type and the physical memory size. By dumping page 0, the processor type 32 can be determined. This is important in computers having a heterogeneous multiprocessor configuration in which not all of the multiple processors are of the same type. After dumping physical page 0, the bus dump process then writes a copy 97 of the entire TLB 37 associated with the frozen processor 32 into the memory of the second processor 34. Next, the bus dump process will sequentially dump all TLB pages 98. For each TLB page, the entries in the TLB are decoded, and the physical pages encoded in the TLB page are requested. As each portion of data is requested, it is sent to the bus dump process over the interprocessor bus 36 and, in turn, routed to the disk storage unit 56. The TLB page counter is incremented, and the process is repeated until all TLB pages are dumped.

In the preferred embodiment, all pages which have been reserved or locked, e.g., those which have been locked by the disk processes, are also dumped 99. These reserved or locked pages represent those pages which have been recently accessed (or are about to be accessed) by the operating system. The reason for dumping these reserved or locked pages is because a disk process, after encountering certain types of errors, will wait a certain period before freezing its host processor. This wait period is often provided in order to give an operator an opportunity to intervene before the freezing of the processor takes place. However, during this wait period, the associated processor continues running. As the processor continues running during this wait period, the corresponding TLB is being updated and overwritten so that TLB entries which might be pertinent to disk errors could be overwritten. The dumping of reserved or locked pages overcomes this problem, because the reserved or locked pages are likely to pertain to disk process errors. The unfrozen processor 34 also imports a copy of any of the reserved or locked pages, as described above, which have not already been dumped by virtue of the dump of TLB pages. These reserved or locked pages are then written to the disk storage unit 56.

In addition to dumping of reserved or locked pages, other memory locations can be dumped, such as the cache tag entries, the data cache, registers, and the like 100.

Typically, following the memory dump, the dumped data is provided to those persons responsible for analyzing dumps, and who will then make an analysis of the state of the computer system at the time the dump was made. If the dump was made in consequence of a catastrophic error condition, the computer system may be reinitialized. After a dump, the CPU must typically be reinitialized.

As will be apparent to those skilled in the art, a number of modifications and variations of the present invention can be used. The present invention can be used in a single processor environment, as well as the many types of multiprocessor environments, including environments with coupled but quasi-autonomous processors, with dedicated memory, environments with or without shared memory, and environments with or without shared TLB's. TLB's can be provided with a non-LRU replacement scheme, such as a random or sequential replacement scheme. The invention can be used by selecting memory for dumping according to any selection scheme which selects at least one memory location which has been more recently used than at least one non-selected memory location. The memory dumping can be controlled by devices other than a processor CPU or an external process, such as a dedicated dumping processor. The dumping can proceed without updating absent entries and without updating a save area. Dumping can be done to other than a tape drive or a disk drive, such as to a CRT screen, a printer, another memory location, or the like. The memory dump can include a dump of other data, such as accumulators, instruction registers, instruction caches, status registers, flags, and the like. The invention can be used when decoding is not necessary, such as when more recently used data are directly stored in a cache. The memory dump invention can be used when only a small amount of total memory is available and in systems where a virtual memory is not provided. Typically, in such a system, address locations are trivially encoded, i.e., the "encoding" is a direct physical memory location, rather than a virtual memory location.

Although the present invention has been described in connection with preferred embodiments, as will be apparent to those skilled in the art, the invention also includes variations and modifications, and is of a scope defined by the appended claims.

What is claimed is:

1. A process for conducting a tape dump of paged addressable memory in a computing device said paged addressable memory having contents, the tape dump being selective with respect to a non-frozen processor, which non-frozen processor acts to access memory locations, said non-frozen processor including an associated updatable microcode save are for storing information, said computing device including a data cache, data cache tags, and a translation lookaside buffer having storage locations, the process comprising:

providing a page table containing a first plurality of encoded page addresses used for address translation in a memory hierarchy process;

writing a second plurality of encoded page addresses to a plurality of storage locations within said translation lookaside buffer, said second plurality of encoded page addresses being addresses of said addressable memory which are accessed by the processor, wherein said writing to at least one of said plurality of readable storage locations in said translation lookaside buffer causes erasing of at least one of said first plurality of encoded page addresses from said translation lookaside buffer;

reserving at least a first data page of said paged addressable memory;

detecting an instruction to initiate a selective memory dump to a first address said first address being the address of an external storage device;

updating processor type information, physical memory size information and the number of pages in said dump in said microcode save area said updating occurring after said step of detecting;

comparing at least a first portion of said second plurality of encoded addresses in said translation lookaside buffer to at least a portion of said first plurality of encoded addresses in said page table to verify validity of said first portion of said plurality of encoded addresses;

writing to said first address, the contents of memory pages at page addresses, said page addresses encoded by a first half of said second plurality of written encoded page addresses;

writing to said first addresses, the contents of memory pages at page addresses, said page addresses being encoded by a second half of said second plurality of written encoded page addresses; and writing to said first address, said data cache tags, the contents of said data cache, and at least said first data page.

2. A process for conducting a bus dump of paged addressable memory in a computing device said paged addressable memory having contents, the bus dump being selective with respect to a first processor in a frozen state, said first processor having an associated updatable microcode save area for storing information, said computing device having a second processor, said computing device having means for communicating between at least said second processor and a data storage device, said computing device including a diagnostic processor said diagnostic processor being coupled with said first and second processors by a maintenance bus, and said computing device having a data cache, data tags, a translation lookaside buffer having storage locations, and a plurality of registers, the process comprising:

providing a page table containing a first plurality of encoded page addresses used for address translation in a memory hierarchy process;

writing to a plurality of storage locations in said translation lookaside buffer, a second plurality of encoded page addresses, wherein said writing to at least one of said plurality of storage locations in said translation lookaside buffer causes erasing of at least one of said first plurality of encoded page addresses;

detecting an instruction to conduct a memory dump;

sending a first command from said second processor over said maintenance bus to said diagnostic processor;

sending a second command, in response to said first command, from said diagnostic processor to said first processor, said second command effective to change said first processor from said frozen state to permit receipt of instructions from said second processor;

sending a third command from said second processor to said first processor to initiate a selective memory dump to said data storage device;

updating information in said associated updatable microcode save area;

comparing at least a first portion of said second plurality of encoded addresses in said translation lookaside buffer to at least a portion of said first plurality of encoded addresses in said page table to verify validity of said portion of said second plurality of encoded addresses;

writing to said data storage device, the contents of memory pages at page addresses, said page addresses being encoded by at least a portion of said second plurality of written encoded page addresses; and writing said data storage device, said data tags, cache tags, and the contents of said data cache.

* * * * *